United States Patent [19]

Yamaguchi et al.

[11] Patent Number: 4,551,386

[45] Date of Patent: Nov. 5, 1985

[54] MAGNETIC RECORDING MATERIALS

[75] Inventors: Nobutaka Yamaguchi; Shinobu Iida; Masahiro Utsumi; Toshimitu Okutu; Kenichi Masuyama; Eiichi Tadokoro, all of Kanagawa, Japan

[73] Assignee: Fuji Photo Film Co., Ltd., Kanagawa, Japan

[21] Appl. No.: 596,776

[22] Filed: Apr. 4, 1984

[30] Foreign Application Priority Data

Apr. 4, 1983 [JP] Japan .................................. 58-59078

[51] Int. Cl.$^4$ .............................................. G11B 5/72
[52] U.S. Cl. ................................. 428/323; 252/62.54; 360/134; 360/135; 360/136; 427/128; 427/131; 428/336; 428/408; 428/694; 428/900
[58] Field of Search ............... 428/694, 695, 408, 336, 428/900, 323, 328, 329; 427/44, 130, 131, 128; 360/134–136; 252/62, 54

[56] References Cited

U.S. PATENT DOCUMENTS

| 4,091,924 | 5/1978 | Newton | 428/900 |
|---|---|---|---|
| 4,135,031 | 1/1979 | Akashi | 428/323 |
| 4,275,113 | 6/1981 | Saito | 428/323 |
| 4,310,599 | 1/1982 | Akashi | 428/323 |
| 4,337,288 | 6/1982 | Takenaka | 428/172 |
| 4,367,261 | 1/1983 | Miyoshi | 428/900 |
| 4,414,270 | 11/1983 | Miyoshi | 428/900 |
| 4,415,630 | 11/1983 | Kubota | 428/500 |
| 4,419,406 | 12/1983 | Isobe | 428/694 |
| 4,448,842 | 5/1984 | Yamaguchi | 427/128 |

Primary Examiner—Ellis P. Robinson
Attorney, Agent, or Firm—Sughrue, Mion, Zinn, Macpeak and Seas

[57] ABSTRACT

A magnetic recording material comprised of a nonmagnetic support base having provided thereon a magnetic recording layer on one side and the back layer on the other side is disclosed. The magnetic recording layer is comprised of ferromagnetic particles dispersed in a binder in combination with carbon black particles having an average primary particle size of 30 $\mu$m or less. The back layer is comprised of a binder having dispersed therein carbon black having an average primary particle size in the range of 50 to 150 m$\mu$. The magnetic recording material has improved electromagnetic properties and improved durability, particularly with respect to video S/N and dropout.

14 Claims, No Drawings

MAGNETIC RECORDING MATERIALS

FIELD OF THE INVENTION

The present invention relates to improving electromagnetic properties and running durability of magnetic recording materials.

BACKGROUND OF THE INVENTION

Carbon black has been added to a magnetic layer mainly to prevent the electrification of the magnetic recording material. When sufficient characteristics cannot be obtained with one kind of carbon black, mixtures have been used. An example of one useful mixture includes carbon black having an average primary particle size of 10 to 30 mμ and carbon black having an average primary particle size of 60 to 120 mμ as described in Japanese Patent Publication No. 9041/79. Further, U.S. Pat. No. 4,328,935 discloses the addition of carbon black in a back layer provided on the opposite side of a non-magnetic support base to the side where a magnetic layer is provided.

However, it is insufficient for satisfying both the electromagnetic properties and the running durability of video tapes used for high density short wavelength recording represented by a VHS system or β-system.

SUMMARY OF THE INVENTION

An object of the present invention is to provide magnetic recording materials having improved electromagnetic properties and improved running durability and, specifically, to provide magnetic recording materials having improved characteristics with respect to the video S/N and dropout.

As a result of earnest studies concerning the above described problem, the present inventors have found that the above described object can be attained by providing magnetic recording materials comprising a non-magnetic support base having on one side thereof a magnetic layer composed of ferromagnetic particles dispersed in a binder with carbon black having an average primary particle size of 30 mμ or less, and a back layer provided on the other side of the support base, the back layer being composed of a binder having dispersed therein contains carbon black having an average primary particle size of 50 to 150 mμ.

DETAILED DESCRIPTION OF THE INVENTION

Carbon black contained in the magnetic layer used in the present invention has an average primary particle size of 30 mμ or less, preferably 5 to 25 mμ, and more preferably 10 to 20 mμ. If the particle size is larger than the above range, electromagnetic properties deteriorate. If it is too small, there is a problem in dispersibility. Examples of fine grain carbon black include "Neospectra Mark I" (8 mμ), "Conductex SC" (17 mμ), "Conductex 950 (21 mμ) and "Conductex 975" (20 mμ) produced by Columbian Carbon Co.; and "Asahi #80" (23 mμ) produced by Asahi Carbon Co.; "Seagull" (23 mμ), "Seast 6H (24 mμ) and "Seast H" (28 mμ) produced by Tokai Denkyoku Co., Ltd.; "Diablack A" (18 mμ), "Diablack I" (21 mμ), "Diablack H" (30 mμ) and N600B" (14 mμ) produced by Mitsubishi Chemical Co., Ltd.; "Shoblack 0" (30 mμ) produced by Showa Denko Co., Ltd.; "MONARCH 1300" (13 mμ), "REGAL 400" (25 mμ) and "VULCAN XC-72" (30 mμ) produced by Cabot Co., Ltd.; and the like.

The amount of carbon black having a particle size of 30 mμ or less added in the magnetic layer is preferably in a range of 1 to 20 parts by weight, more preferably 3 to 15 parts by weight, most preferably 5 to 10 parts by weight, based on 100 parts by weight of the magnetic material. If the amount is smaller, the effect of preventing electrification is inferior. If it is larger, the degree of packing of the magnetic material is reduced and the electromagnetic properties deteriorate.

The carbon black contained in the back layer of the present invention has an average primary particle size of 50 to 150 mμ, preferably 70 to 120 mμ, and more preferably 80 to 110 mμ. If the particle size is smaller, running durability deteriorates. On the other hand, if it is larger, smoothness of the coating film is inferior and uneveness is easily transferred on the surface of the magnetic layer to cause deterioration of electromagnetic properties. Examples of such carbon black include "Asahi #55" (77 mμ), "Asahi Thermal" (90 mμ), "Asahi #50" (94 mμ), "Asahi #35" (115 mμ), "HS-500" (85 mμ) and "Asahi #70" (50 mμ) produced by Asahi Carbon Co., Ltd.; "Diablack G" (84 mμ) produced by Mitsubishi Chemical Co., Ltd.; "REGAL SRF-S" (60 mμ) and "STERLING NS" (75 mμ) produced by Cabot Co., Ltd.; and the like.

The amount of carbon black having a particle size of 50 to 150 mμ added in the back layer is in a range of 5 to 500 parts by weight, preferably 10 to 200 parts by weight and, more preferably 50 to 150 parts by weight, based on 100 parts by weight of the binder in the back layer.

In the magnetic layer and the back layer, carbon black having a particle sizes not fallen within the range defined above may be included as long as the effect of the present invention is not deteriorated and is generally in an amount of not more than ⅓, preferably not more than 1/5, more preferably not more than 1/10, the weight of carbon blacks of the present invention added in the magnetic layer and the back layer, respectively.

All of the carbon black may be fed into a dispersing machine at the same time to produce a magnetic solution or a back solution, but it is possible to use a method which comprises feeding some of the carbon black previously, and feeding the residual part thereof after dispersing is carried out to some degree.

With respect to dispersing the carbon black, it is effective to use a method which comprises kneading carbon black with a binder by means of a three-roll mill, etc. and, thereafter, preparing a dispersion by means of a dispersing machine. Further, with respect to electric conductivity, as much carbon black as possible is added in the latter half of the dispersing process to prepare a dispersion and not interrupt the chain structure.

Useful lubricants which may be contained in the magnetic layer, include silicone oils, liquid paraffins, aliphatic acids, aliphatic acid esters and fluorinated oils, etc. Of course, the lubricants are not limited to them, and any substances can be used if they are used as lubricants for conventional magnetic recording materials. If necessary, a mixture of lubricants can be used, too.

The amount of the lubricants in the magnetic layer is preferably in a range of 0.1 to 1000 parts by weight, more preferably 1 to 500 parts by weight and, particularly preferably 10 to 100 parts by weight, based on 100 parts by weight of carbon black in the magnetic layer.

Other additives which may be present in the magnetic layer include binders, abrasives, dispersing agents, plasticizers, stabilizers, fillers and other lubricants. Further, the magnetic layer may be applied to conventional support bases for magnetic recording materials. These additives and support bases have been described in Japanese Patent Publication No. 26890/81 and U.S. Pat. No. 4,135,016.

Useful binders include those conventionally used for magnetic recording materials, for example, cellulose derivatives (e.g. nitrocellulose and cellulose propionate), vinyl acetate-vinyl chloride copolymer resins (including resins containing vinyl alcohol and resins containing maleic acid), polyurethanes, epoxy resins, polyamides, polyisocyantes and polyesters, etc. The binder is generally used in an amount of 5 to 100 parts by weight, preferably 10 to 100 parts by weight, more preferably 15 to 50 parts by weight, based on 100 parts by weight of ferromagnetic powders. Useful abrasives include $\alpha$-$Al_2O_3$, $Cr_2O_3$, SiC and $\alpha$-$Fe_2O_3$, etc. Dispersing agents such as lecithin, etc., plasticizers such as TPP or DBP, etc. and stabilizers such as lead stearate, etc. are added as occasion demands. Further, inorganic powders such as silica, $CaCO_3$ or talc, etc. may be added.

Useful bases include those comprised of polyethylene terephthalate, polyamide, polyethylene naphthalate, polyimide and triacetyl cellulose, etc. The thickness of base is generally from 3 to 100 $\mu$m, preferably from 5 to 50 $\mu$m and more preferably from 8 to 20 $\mu$m.

Useful magnetic materials include ferromagnetic particles used for conventional magnetic recording materials such as $\gamma$-$Fe_2O_3$, $FeO_x$ (1.33<x<1.5), $CrO_2$, Co-added $\gamma$-$Fe_2O_3$, Co-added $FeO_x$ (1.33<x<1.5), flat Ba-ferrite, Fe-Co-Ni alloy powder and Fe-Zn alloy powder. Of these, Co-added $\gamma$-$Fe_2O_3$ and Co-added $FeO_x$ are preferably used in the present invention.

The iron oxide type magnetic materials may have any shape, for example, granular, needle-like or spingle-like shape, etc. If necessary, they may be used as a mixture.

It is advantageous for a electromagnetic porperties and, particularly, video S/N that the particle size of the magnetic material is smaller. It is preferred that the BET specific surface area using nitrogen gas is from 20 $m^2/g$ or more, preferably 20 to 70 $m^2/g$ and particularly preferably 30 to 70 $m^2/g$.

Useful solvents include those used for conventional magnetic tapes, and the examples include ketones such as methyl ethyl ketone, esters such as ethyl acetate, alcohols such as butyl alcohol, aromatic hydrocarbons such as toluene, and chlorinated solvents such as carbon tetrachloride, etc.

The thickness of the magnetic layer is generally from 1 to 20 $\mu$m, preferably from 2 to 10 $\mu$m and more preferably from 3 to 8 $\mu$m.

The binders and solvents used for the back layer may be the same as those used for the magnetic layer as described above. Additives, stabilizers, plasticizers, dispersing agents, abrasives and inorganic powders, etc. which are added as occasion demands are the same as described above. Further, the method of preparing the dispersion is the same as described above. These additives and the method are described in, for example, Japanese Patent Publication Nos. 21321/76 and 17401/77 and Japanese Patent application (OPI) No. 28507/80, etc.

The back layer is preferred to have a thickness of 0.01 to 3 $\mu$m, more preferably 0.1 to 2 $\mu$m and particularly preferably 0.3 to 1.5 $\mu$m. If it is too thick, surface smoothness is inferior and unevenness is transferred to the surface of the magnetic layer to deteriorate the electromagnetic properties. If it is too thin, film strength deteriorates.

In the following, the present invention is illustrated in detail with reference of examples. However, the scope of the invention is not limited to the examples.

In the following compositions, "part" means "part by weight", which is represented by the weight of the solid content.

EXAMPLE 1

| | |
|---|---|
| Magnetic material (Co-added $\gamma$-$Fe_2O_3$ BET: 35 $m^2/g$) | 100 parts |
| Vinyl chloride-vinyl acetate copolymer ("S-lec M" produced by Sekisui Chemical Co.) | 8 parts |
| Polyurethane ("N2301" produced by Nippon Polyurethane Co.) | 4 parts |
| Polyisocyanate ("Coronate L" produced by Nippon Polyurethane Co.) | 3 parts |
| Carbon black (having an average particle size shown in Table 1) | 8 parts |
| Silicone oil | 0.5 parts |
| Oleic acid | 1 part |
| Ethyl stearate | 1 part |
| Abrasive ($\alpha$-$Al_2O_3$) | 3 parts |
| Methyl ethyl ketone | 300 parts |

After the above described composition was processed by a ball mill, the resulting dispersion was applied to a 15 $\mu$m-thick polyethylene terephthalate film to which a back layer having a thickness of 1.5 $\mu$m was formed as described later, by a doctor process so as to form a magnetic layer having a dry thickness of 5 $\mu$m.

After being subjected to calendering treatment, it was cut into ½ inch widths to obtain VHS system video tapes (Samples No. 1 to No. 5).

The composition of the back layer used above is described in the following.

| | |
|---|---|
| Carbon black (having an average particle size shown in Table 1) | 100 parts |
| Nitrocellulose | 30 parts |
| Polyurethane | 25 parts |
| Polyisocyanate | 15 parts |
| $\alpha$-$Fe_2O_3$ (needle-like, longitudinal axis: 0.5 $\mu$m) | 10 parts |
| Calcium carbonate (granular, 0.5 $\mu$m) | 10 parts |
| Methyl ethyl ketone | 1000 parts |
| Butyl acetate | 500 parts |

The above described composition was processed by a ball mill. After the resulting dispersion was filtered by a filter having an average opening size of 0.5 $\mu$m, the viscosity was adjusted, followed by filtering again. It was applied by a reverse roll process so as to result in a thickness of 1.5 $\mu$m.

COMPARATIVE EXAMPLE 1

Samples No. 6–13 were obtained in the same manner as Example 1, except that the particle sizes of carbon black in the magnetic layer and the back layer were changed.

EXAMPLE 2

Using the composition of Sample No. 1 in Example 1, the magnetic material was replaced with a magnetic material having a BET surface area shown in Table 1 to obtain Sample No. 14.

EXAMPLE 3

Using the composition of Sample No. 1 in Example 1, the back layer was replaced with that having a thickness of 0.6 μm to obtain Sample No. 15.

COMPARATIVE EXAMPLE 2

Using the composition of Sample No. 1 in Example 1, the back layer was not applied, by which Sample No. 16 was formed.

Contents and results of the above described samples are shown in Table 1.

Video S/N is shown as a relative value compared with a standard tape produced by Fuji Photo Film Co. using a VHS system VTR.

Increase of dropout is shown as a difference (D.O.II - D.O.I) between the number of dropouts per minute in case of carrying out recording/reproduction of signals after the tape is produced (referred to as D.O.I) and the number of dropouts per minute when carrying out recording/reproduction of signals after running of the tape is repeated 500 times under a high temperature low humidity condition at 40° C. and 15% RH (referred to as D.O.II). It is shown that the smaller the difference is, the better the running durability is.

and modifications can be made therein without departing from the spirit and scope thereof.

What is claimed is:

1. A magnetic recording material, comprising:
    a non-magnetic support having provided on one side thereof;
    a magnetic recording layer comprised of ferromagnetic particles dispersed in a binder with carbon black particles having an average primary particle size of 30 mμ or less; and
    a back layer provided on the other side of the support, the back layer being comprised of a binder having dispersed therein carbon black having an average primary particle size in the range of 50 to 150 mμ, wherein the magnetic recording layer includes the carbon black having an average particle size of 30 mμ or less in an amount in the range of 1 to 20 parts by weight per 100 parts by weight of the ferromagnetic particles.

2. A magnetic recording material as claimed in claim 1, wherein the carbon black in the magnetic recording layer has an average primary particle size in the range of 5 to 25 mμ.

3. A magnetic recording material as claimed in claim 2, wherein the magnetic recording layer includes carbon black having an average primary particle size in the range of 10 to 20 mμ.

TABLE 1

| Sample No. | Example and Comparative Example | Average particle size of carbon black in magnetic layer (mμ) | Average particle size of carbon black in back layer (mμ) | BET relative surface area of magnetic material (m²/g) | Thickness of back coating layer (μ) | Video S/N (dB) | Increase of dropout (/minute) |
|---|---|---|---|---|---|---|---|
| 1 | Example 1 | 20 | 90 | 35 | 1.5 | 3.0 | 7 |
| 2 | " | " | 50 | " | " | 2.5 | 17 |
| 3 | " | " | 150 | " | " | 1.3 | 15 |
| 4 | " | 30 | 50 | " | " | 2.0 | 18 |
| 5 | " | " | 150 | " | " | 1.0 | 16 |
| 6 | Comparative Example 1 | 20 | 20 | " | " | 3.0 | 200< |
| 7 | Comparative Example 1 | 20 | 200 | " | " | 1.5 | 75 |
| 8 | Comparative Example 1 | 90 | 20 | " | " | −1.0 | 200< |
| 9 | Comparative Example 1 | 90 | 90 | " | " | −1.0 | 11 |
| 10 | Comparative Example 1 | 90 | 200 | " | " | −1.5 | 65 |
| 11 | Comparative Example 1 | 200 | 20 | " | " | −3.0 | 200< |
| 12 | Comparative Example 1 | 200 | 90 | " | " | −3.0 | 10 |
| 13 | Comparative Example 1 | 200 | 200 | " | " | −3.0 | 70 |
| 14 | Example 2 | 20 | 90 | 20 | " | −0.5 | 6 |
| 15 | Example 3 | 20 | 90 | 35 | 0.6 | 3.5 | 8 |
| 16 | Comparative Example 2 | 20 | — | 35 | — | 3.5 | 200< |

Table 1 clearly shows that Sample No. 1 of the present invention is excellent in video S/N and increase of dropout as compared with Comparative Samples No. 6–No. 13. With respect to the average particle size of carbon black in the magnetic layer and the average particle size of carbon black in the back layer, only the combination of carbon black defined above is suitable.

In Sample No. 15 of the present invention in which the thickness of the back layer is reduced, video S/N is excellent. But, if the back layer is removed (Sample No. 16), dropout is markedly increased.

While the invention has been described in detail and with reference to specific embodiments thereof, it will be apparent to one skilled in the art that various changes 4. A magnetic recording material as claimed in claim 2, where in the carbon black in the back layer has an average primary particle size in the range of 70 to 120 mμ.

5. A magnetic recording material as claimed in claim 3, wherein the carbon black in the back layer has an average primary particle size in the range of 80 to 110 mμ.

6. A magnetic recording material as claimed in claim 1, wherein the carbon black in the magnetic recording layer is present in an amount in the range of 3 to 15 parts by weight per 100 parts by weight of the ferromagnetic particles.

7. A magnetic recording material as claimed in claim 1, wherein the back layer includes a carbon black having a particle size in the range of 50 to 150 mμ in an amount in the range of 5 to 500 parts by weight per 100 parts by weight of the binder in the back layer.

8. A magnetic recording material as claimed in claim 6, wherein the back layer includes carbon black having an average primary particle size in the range of 50 to 150 mμ in an amount in the range of 10 to 200 parts by weight per 100 parts by weight of the binder in the back layer.

9. A magnetic recording material as claimed in claim 1, wherein the back layer has a thickness of 0.01 to 3 μm.

10. A magnetic recording material as claimed in claim 9, wherein the back layer has a thickness of 0.1 to 2 μm.

11. A magnetic recording material as claimed in claim 10, wherein the back layer has a thickness in the range of 0.3 to 1.5 μm.

12. A magnetic recording material as claimed in claim 1, wherein the ferromagnetic particles have the BET specific surface area of 20 m$^2$/g or more.

13. A magnetic recording material as claimed in claim 12, wherein the ferromagnetic particles have the BET specific surface area of 20 to 70 m$^2$/g.

14. A magnetic recording material as claimed in claim 13, wherein the ferromagnetic particles have the BET specific surface area of 30 to 70 m$^2$/g.

* * * * *